United States Patent
Tabatowski-Bush et al.

(10) Patent No.: US 9,381,824 B2
(45) Date of Patent: Jul. 5, 2016

(54) CIRCUIT AND METHOD FOR DETECTION OF BATTERY CELL DRAIN

(71) Applicant: Ford Global Technologies, LLC, Dearborn, MI (US)

(72) Inventors: Benjamin A. Tabatowski-Bush, South Lyon, MI (US); Ai Keramidas, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/502,419

(22) Filed: Sep. 30, 2014

(65) Prior Publication Data

US 2016/0089999 A1  Mar. 31, 2016

(51) Int. Cl.
*H02J 7/00* (2006.01)
*B60L 11/18* (2006.01)

(52) U.S. Cl.
CPC ......... *B60L 11/1861* (2013.01); *B60L 11/1859* (2013.01); *H02J 7/0014* (2013.01); *Y10S 903/907* (2013.01)

(58) Field of Classification Search
CPC . B60L 11/1861; B60L 11/1859; H02J 7/0014
USPC ............................................. 701/22; 320/116
See application file for complete search history.

(56) References Cited

U.S. PATENT DOCUMENTS

| | | | | |
|---|---|---|---|---|
| 6,066,899 A | * | 5/2000 | Rund | H02J 9/06 307/10.7 |
| 6,424,157 B1 | * | 7/2002 | Gollomp | G01R 31/006 320/132 |
| 8,473,114 B2 | * | 6/2013 | Bauerle | H01M 10/42 320/132 |
| 8,775,008 B2 | * | 7/2014 | Rini | G06F 17/00 396/48 |
| 8,793,042 B2 | * | 7/2014 | Gale | H01M 10/4207 701/22 |
| 8,854,008 B2 | * | 10/2014 | Liu | H01M 10/48 320/116 |
| 8,996,241 B2 | * | 3/2015 | Uchida | B60L 3/0046 701/29.1 |
| 9,002,537 B2 | * | 4/2015 | Duncan | 701/2 |
| 9,209,630 B2 | * | 12/2015 | Naghshtabrizi | H02J 7/0016 |
| 9,260,033 B2 | * | 2/2016 | Hayashida | B60L 11/1862 |
| 2013/0038293 A1 | | 2/2013 | Seman, Jr. et al. | |
| 2013/0154656 A1 | | 6/2013 | Tabatowski-Bush | |
| 2013/0200690 A1 | * | 8/2013 | Rini | H02J 7/0031 307/9.1 |

* cited by examiner

*Primary Examiner* — Behrang Badii
*Assistant Examiner* — Michael Berns
(74) *Attorney, Agent, or Firm* — David B. Kelley; Brooks Kushman P.C.

(57) ABSTRACT

A vehicle includes a traction battery and a battery management system. The battery management system includes a controller programmed to output a drained cell diagnostic indicator. The drained cell diagnostic indicator is based on a magnitude of a difference between an average cell state of charge at a start of a battery rest period and a cell state of charge estimated at predetermined intervals during the battery rest period being greater than a predetermined value. A response to the drained cell diagnostic indicator depends on the magnitude of the cell drain rate and may include operating the traction battery at a reduced power level and notifying an operator of the diagnostic condition.

19 Claims, 4 Drawing Sheets

CIRCUIT AND METHOD FOR DETECTION OF BATTERY CELL DRAIN

TECHNICAL FIELD

This application generally relates to battery cell drain detection for vehicles.

BACKGROUND

A hybrid-electric or all-electric vehicle includes a traction battery constructed of multiple battery cells in series and/or parallel. The traction battery provides power for vehicle propulsion and accessory features. During operation, the traction battery may be charged or discharged based on the operating conditions. Under normal circumstances, a traction battery can retain charge while the battery is resting. A traction battery that cannot effectively hold a charge while the battery is resting may cause operator dissatisfaction if the traction battery completely discharges in a short period of time.

SUMMARY

A battery management system includes at least one controller programmed to, in response to a magnitude of a difference between an average cell state of charge at a start of a battery rest period and at least one of a plurality of cell states of charge estimated at predetermined intervals during the battery rest period being greater than a predetermined value, output a drained cell diagnostic indicator. The at least one controller may be further programmed to output the drained cell diagnostic indicator in response to a magnitude of a difference between an average rate of change in cell state of charge over the predetermined intervals and a rate of change in cell state of charge between the predetermined intervals being less than a predetermined threshold for each of the predetermined intervals. The at least one controller may be further programmed to output the drained cell diagnostic indicator in response to a magnitude of a difference between a cell state of charge estimated at the predetermined intervals and a cell state of charge at the start of the battery rest period being greater than a predetermined difference.

The at least one controller may be further programmed to operate a traction battery during a period of battery usage according to a cell drain rate that is based on the cell state of charge at the predetermined intervals and a cell state of charge at the start of the battery rest period. The at least one controller may be further programmed to operate the traction battery according to a battery power limit that is a predetermined minimum value when the cell drain rate is greater than a predetermined threshold. The at least one controller may be further programmed to operate the traction battery according to a battery power limit that is a predetermined percentage of a base battery power limit when the cell drain rate is greater than a predetermined threshold. The at least one controller may be further programmed to operate the traction battery according to a zero battery power limit when the drain rate is greater than a predetermined threshold and the cell state of charge at the predetermined intervals is outside of a predetermined range.

The average cell state of charge at the start of the battery rest period may be an average of all of the cell states of charge at the start of the battery rest period. The battery rest period may be a period of time in which a magnitude of a battery current is less than a predetermined current.

A vehicle includes a traction battery including a plurality of cells and at least one controller programmed to operate the traction battery according to a cell drain rate that is based on a cell state of charge at a start of a battery rest period and cell states of charge at predetermined intervals during the battery rest period. The at least one controller may be further programmed to output a drained cell diagnostic indicator in response to a magnitude of a difference between an average cell state of charge at a start of the battery rest period and a cell state of charge estimated at predetermined intervals during the battery rest period being greater than a predetermined value. The at least one controller may be further programmed to output a drained cell diagnostic indicator in response to a magnitude of a difference between an average change in cell state of charge between the predetermined intervals and a change in cell state of charge between the predetermined intervals being less than a predetermined threshold for each of the predetermined intervals. The cell drain rate may be further based on a battery capacity and an elapsed time since the start of the battery rest period. The at least one controller may be further programmed to operate the traction battery according to a battery power limit that is a predetermined minimum value when the cell drain rate is greater than a predetermined threshold. The at least one controller may be further programmed to operate the traction battery according to a battery power limit that is a predetermined percentage of a base battery power limit when the cell drain rate is greater than a predetermined threshold.

A method of operating a traction battery includes outputting, by a controller, a drained cell diagnostic in response to a cell state of charge estimated at predetermined intervals during a battery rest period being outside of a predetermined range about an average cell state of charge computed at a start of the battery rest period. The method further includes operating, by the controller, the traction battery according to the drained cell diagnostic and a cell drain rate. The drain rate may be based on a difference between the cell state of charge at the start of the battery rest period and the cell state of charge at the predetermined intervals. Operating the traction battery may include limiting battery power to a predetermined minimum value when the cell drain rate is greater than a predetermined threshold. Operating the traction battery may include limiting battery power to a predetermined percentage of a base battery power limit when the cell drain rate is greater than a predetermined threshold. Outputting the drained cell diagnostic may be further based on a rate of change of the cell state of charge between the predetermined intervals being within a predetermined range about an average rate of change of the cell state of charge over the predetermined intervals.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
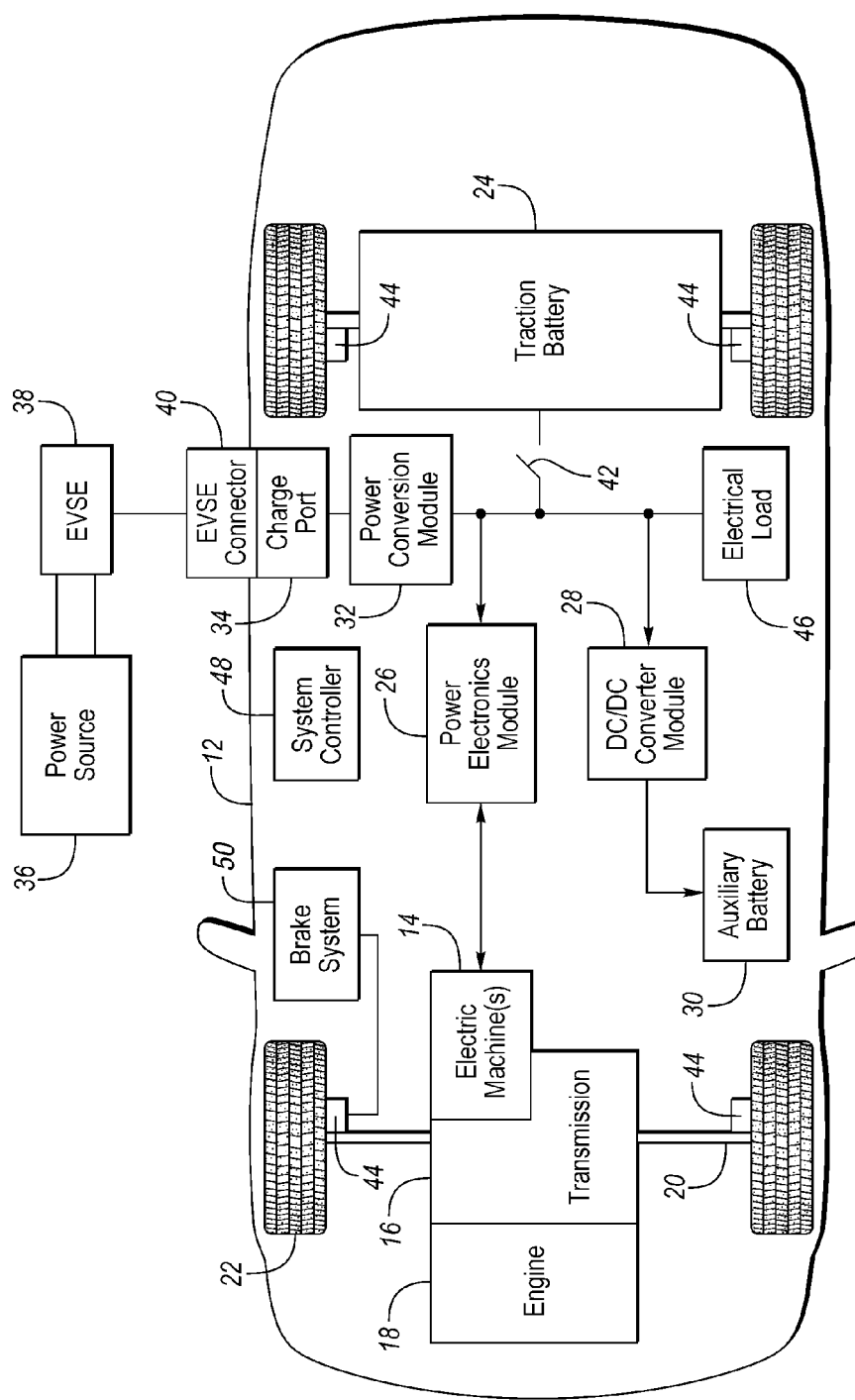
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet that receives utility power. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. A system controller 48 may be present to coordinate the operation of the various components.

Figure 2:
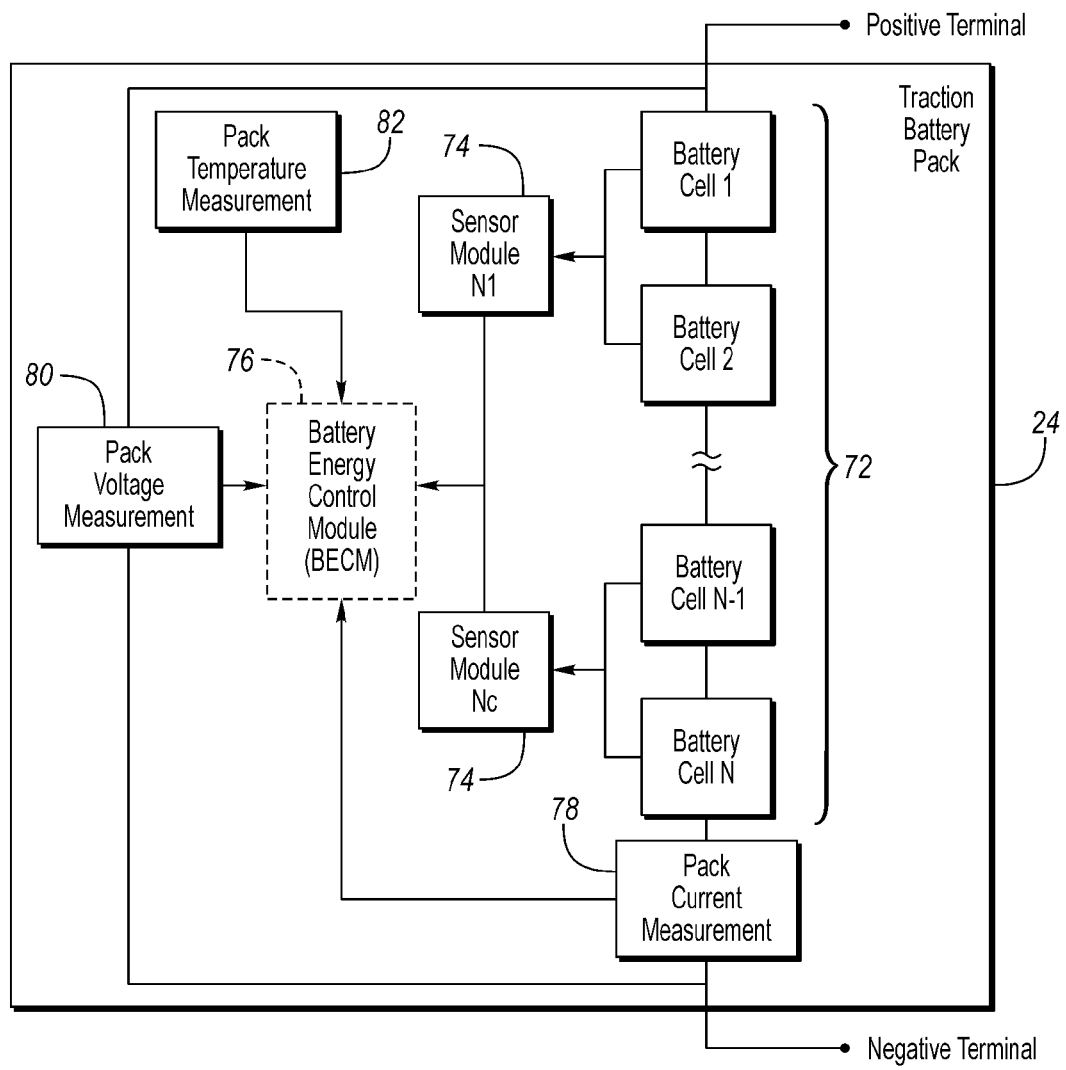
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a series configuration of N battery cells 72. Other battery packs 24, however, may be composed of any number of individual battery cells connected in series or parallel or some combination thereof. A battery management system may have a one or more controllers, such as a Battery Energy Control Module (BECM) 76 that monitors and controls the performance of the traction battery 24. The BECM 76 may include sensors and circuitry to monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. The battery management system may use a sensor module 74 to measure the battery cell 72 characteristics. Depending on the capabilities, the sensor module 74 may include sensors and circuitry to measure the characteristics of one or multiple of the battery cells 72. The battery management system may utilize up to $N_c$ sensor modules or Battery Monitor Integrated Circuits (BMIC) 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

The BECM 76 may include circuitry to interface with the one or more contactors 42. The positive and negative terminals of the traction battery 24 may be protected by contactors 42.

Battery pack state of charge (SOC) gives an indication of how much charge remains in the battery cells 72 or the battery pack 24. The battery pack SOC may be output to inform the driver of how much charge remains in the battery pack 24, similar to a fuel gauge. The battery pack SOC may also be used to control the operation of an electric or hybrid-electric vehicle 12. Calculation of battery pack SOC can be accomplished by a variety of methods. One possible method of calculating battery SOC is to perform an integration of the battery pack current over time. This is well-known in the art as ampere-hour integration.

Battery SOC may also be derived from a model-based estimation. The model-based estimation may utilize cell voltage measurements, the pack current measurement, and the cell and pack temperature measurements to estimate the SOC value. The apparatus and methods described herein are not dependent upon the particular method used to calculate SOC.

The BECM 76 may have power available at all times. The BECM 76 may include a wake-up timer so that a wake-up may be scheduled at any time. The wake-up timer may wake up the BECM 76 so that predetermined functions may be executed. The BECM 76 may include non-volatile memory so that data may be stored when the BECM 76 is powered off or loses power. The non-volatile memory may include Electrical Erasable Programmable Read Only Memory (EEPROM) or Non-Volatile Random Access Memory (NVRAM). The non-volatile memory may include FLASH memory of a microcontroller.

During operation of the traction battery 24, the SOC of the battery cells 72 may vary from one another. The BECM 76 or the sensor modules 74 may include a cell balance feature that allows the SOC of the cells to be equalized to a specific level. The specific level may be a pack average SOC. The pack average SOC may be the average of all of the cell SOC values. The cell balance feature may include a switch and a resistor across each of the battery cells 72. When the switch is closed, current may flow through the resistor to remove charge from the battery cell 72. When the traction battery 24 is operating normally, the individual cell SOC values may be in a predetermined tolerance band about the average SOC. That is, the individual cell states of charge may have a range of values defined by $SOC_{avg} \pm K_1$, where $K_1$ is a predetermined tolerance (e.g., 5%).

The SOC of a battery cell 72 may drift from the equalized value for many reasons. When the cell SOC falls below the tolerance band about the pack average SOC, the condition may be denoted as a cell drain condition. A cell drain condition may be caused by internal conditions of the cell. Conditions external to the battery cell, such as short circuits, may also cause a cell drain condition of the battery cell 72. The external conditions may be in the sensor circuitry 74 or within the wiring of the battery pack 24. A diagnostic condition may be detected when the battery cell SOC is less than the tolerance band about the pack average SOC.

The battery management system may attempt to detect any cell drain conditions that may be present in the battery pack 24. Each battery cell 72 may have an associated flag in the non-volatile memory to indicate a cell drain condition for the battery cell 72. This flag may be denoted as a drained cell flag. In response to the drained cell flag, the BECM 76 may initiate a diagnostic response. The diagnostic response may include alerting the operator and operating the traction battery 24 in a modified manner.

Each battery cell 72 may also store an associated drain rate in the non-volatile memory. Assuming a fixed interval between measurements, the drain rate may be stored in units of current (e.g., milliamps (mA)). The logic described is applicable regardless of the units selected for the drain rate. The drain rate may be zero for a normally operating battery cell. A normally operating battery cell may also have a relatively small non-zero drain rate (e.g., 0.01 mA). The drain rate may vary within a predetermined range for a normally operating traction battery. A battery cell with a drain rate above a predetermined threshold may be indicative of a diagnostic condition related to that battery cell. When the drain rate is above the predetermined threshold, the drained cell flag for that battery cell may be set.

After a drive cycle, the SOC of each battery cell ($SOC_{ko}(x)$) may be stored in the non-volatile memory at the time of key off. At key off, the BECM 76 may operate for a period of time before powering down or entering a low power mode. Before powering down, an average battery pack voltage ($SOC_{avg}$) may be computed as the average of the cell SOC values. That is, the average battery pack voltage may be calculated as the sum of all the individual cell SOC values divided by the number of cells.

The BECM 76 may be configured to wake up at predetermined time intervals (e.g., every 30 minutes) to execute specified functions. Upon wake up, the BECM 76 may measure the open-circuit voltage for each of the battery cells. The SOC of each cell may be calculated based on the open-circuit voltage measurement. For a Lithium-Ion battery cell, it is well known that after a period of battery rest, the open-circuit voltage may be determined by measuring the terminal voltage of the battery cell. When no current is flowing through the battery, the open-circuit voltage is equivalent to the terminal voltage. When current is flowing through the battery the open-circuit voltage and the terminal voltage differ because of internal resistances and capacitances within the battery.

Figure 3:
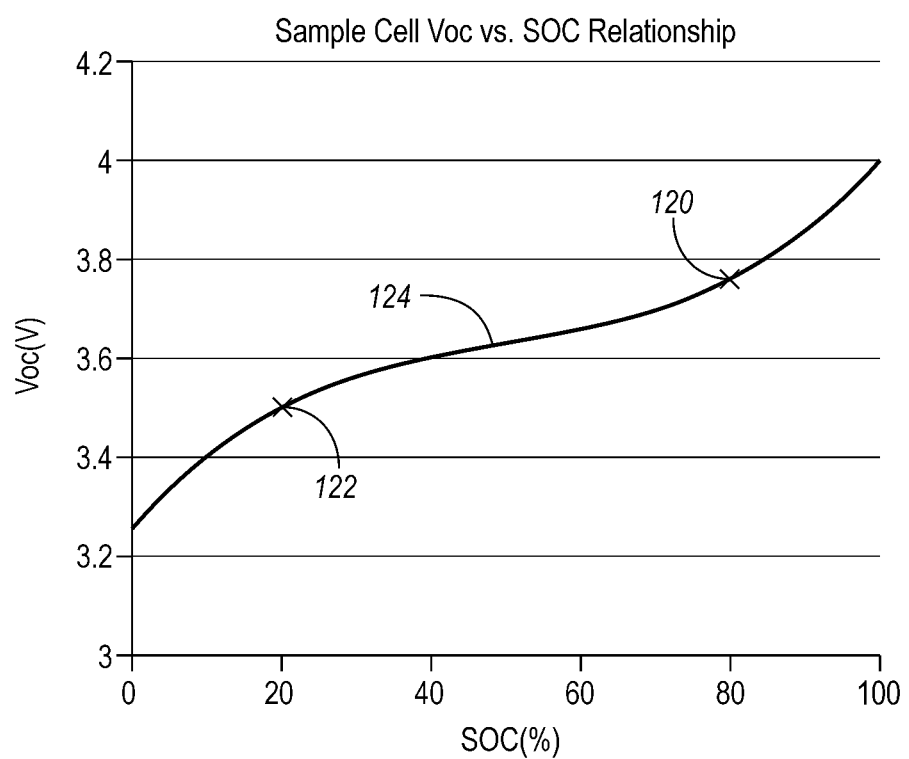
FIG. 3 is a graph that illustrates a possible open-circuit voltage (Voc) vs. battery state of charge (SOC) relationship for a typical battery cell.

For a typical Lithium-Ion battery cell, there is a relationship between SOC and the open-circuit voltage ($V_{oc}$) such that $V_{oc}=f(SOC)$. FIG. 3 shows an example curve 124 showing the open-circuit voltage $V_{oc}$ as a function of SOC. The relationship between SOC and $V_{oc}$ may be determined from an analysis of battery properties or from testing the battery cells. The function may be such that SOC may be calculated as $f^{-1}(V_{oc})$. The function or the inverse function may be implemented as a table lookup or an equivalent equation. The exact shape of the curve 124 may vary based on the exact formulation of the Lithium-Ion battery. The voltage $V_{oc}$ changes as a result of charging and discharging of the battery. Note that the curve may vary based on the battery chemistry. For example, the voltage associated with 100% SOC may change for different battery chemistries. The OCV/SOC characteristic may be dependent upon the battery temperature and may be depicted as a series of curves for different temperatures.

As seen in FIG. 3, as the SOC increases, the open-circuit voltage generally increases as well. As the battery is charged, the SOC increases and the open-circuit voltage rises. The rate of voltage increase may depend on the state of charge. For example, the slope at different points on the curve (e.g., 120 and 122) may be different. The open-circuit voltage based SOC may be denoted as $SOC_{ocv}$.

The cell SOC at the wake up time may be compared to the average cell SOC value that was stored at key off or power down. The battery cells may be considered to be functioning properly when the following expression is met for all of the battery cells.

$$SOC_{avg} - K_1 \leq SOC_{ocv}(x) \leq SOC_{avg} + K_1 \text{ for all } x \quad (1)$$

A diagnostic condition may be stored when the following expression is met for any of the battery cells.

$$|SOC_{ocv}(x) - SOC_{avg}| > K_1) \quad (2)$$

A cell SOC above the range about the average SOC may indicate a balancing issue. A cell SOC below the range about the average SOC may indicate a cell drain issue. The drain rate for each battery cell may be calculated as:

$$\text{DrainRate}(x) = (SOC_{ko}(x) - SOC_{ocv}(x)) * Q/T_{rest} \quad (3)$$

where Q is the capacity of the battery in Amp-Hours and $T_{rest}$ is the elapsed time between the key off and the time of the open-circuit voltage measurement. Note that the drain rate decreases as the SOC change decreases. The drain rate may be calculated such that a decrease in SOC over the battery rest period yields a positive value. Other sign conventions are possible and the various thresholds may be adjusted accordingly.

Additional conditions may be considered for storing the values and setting the drained cell flags. For example, the system may determine that the sensor modules 74 are functioning properly before setting the drained cell flags. In addition, cell voltages may be checked to ensure that the measurements are within a valid operating range. For example, cell voltages that may be out of range due to short or open circuit conditions may not be considered. Additionally, cell state of charge values may be checked to ensure that the values are within a valid state of charge range.

In the event that charge is being drained from a battery cell, the SOC value may be lower at each wake up cycle of the controller 76. Assuming a constant drain rate and a constant wake up interval, the SOC may decrease a similar amount between each wake up cycle. The controller 76 may calculate the decrease in SOC between each of the wake up cycles. An average SOC decrease may be calculated as an average of a predetermined number of the SOC decreases. For example, an average SOC decrease may be calculated as the sum of the last N SOC decreases divided by N.

The change in SOC for the $x^{th}$ cell from the previous wakeup cycle may be expressed as $$\Delta SOC(x,k) = SOC_{ocv}(x,k) - SOC_{ocv}(x,k-1) \quad (4)$$

where k indicates the present wake up cycle and k−1 indicates the immediately previous wake up cycle. Note that $SOC_{ocv}(x, 0)$ may be $SOC_{avg}$ from the last key off event. The average change in SOC may be expressed as:

$$\Delta SOC_{avg}(x) = (\Delta SOC(x,1) + \Delta SOC(x,2) + \ldots + \Delta SOC(x,N))/N \quad (5)$$

The battery management system may check to determine if the SOC change is within a predetermined range about the average between wake-up cycles before setting the drained cell flag. The following expression may be satisfied to confirm setting of the drained cell flag:

$$[\Delta SOC_{avg}(x) - K_5] < \Delta SOC(x,k) < [\Delta SOC_{avg}(x) + K_5] \quad (6)$$

where $K_5$ is a predetermined tolerance (e.g., 2%). The condition may be alternately expressed as $$|\Delta SOC(x,k) - \Delta SOC_{avg}(x)| < K_5 \quad (7)$$

The expression may be evaluated for each of the wake up cycles (k). Setting the drained cell flag may be conditioned upon the change in cell SOC between each of the wakeup cycles being within a predetermined tolerance of the average change in cell SOC. This condition may indicate that the SOC decrease is caused by an actual cell drain issue and not by noisy voltage measurements. Should a nearly consistent rate of change in the cell SOC be detected, the drained cell flag may be set and stored for the battery cell.

For each wake-up cycle, a drain rate may be calculated and stored as described. The drain rate may be used to select a diagnostic response when the associated drained cell flag is set. The magnitude of the drain rate may be compared to one or more predetermined thresholds to determine a course of action.

The drain rate may be compared to a first threshold, $K_4$. The $K_4$ threshold may indicate a level for driver notification and a major controls response. For example, the battery power limits may be reduced to a predetermined minimum power level (e.g., 1.5 kW) when a cell drain rate is above the $K_4$ threshold. More restrictive control actions may be taken in conjunction with other conditions. For example, the traction battery may be powered off when a cell drain rate is above the $K_4$ threshold and other conditions are present, such as the cell SOC being outside of a predetermined range or the cell voltage being outside of predetermined voltage limits.

Driver notification may include the storage of a diagnostic trouble code (DTC) in the non-volatile memory. The DTC may trigger the display of an indicator to the operator. For example, a service battery soon message may be displayed to the operator. The DTC may be available for display to service personnel via a diagnostic tool.

The drain rate may be compared to a second threshold, $K_3$. The $K_3$ threshold may indicate a level for driver notification and a mild control response. For example, the battery power limits may be set to 75% of the base battery power limits when the cell drain rate is above the $K_3$ threshold.

The drain rate may be compared to a third threshold, $K_2$. The $K_2$ threshold may indicate a level for driver notification with no control action. When the cell drain rate is greater than the $K_2$ threshold, a diagnostic trouble code (DTC) may be set and stored in non-volatile memory with no further control actions. The $K_2$ threshold may be indicative of upcoming issues with the battery cell.

The thresholds may be selected to balance the availability of traction battery functionality with the desire to notify the operator of battery issues. In general, the thresholds may be configured such that $K_2 < K_3 < K_4$. The particular values selected for the thresholds may depend upon the battery chemistry and configuration. Additionally, the system may determine the number of cells reporting a drained cell flag. The diagnostic response may be further determined based on the number of cells reporting a drained cell flag. For example, when the number cells that are reporting a cell drain condition reached a predetermined threshold, a major controls response may be triggered.

Figure 4:
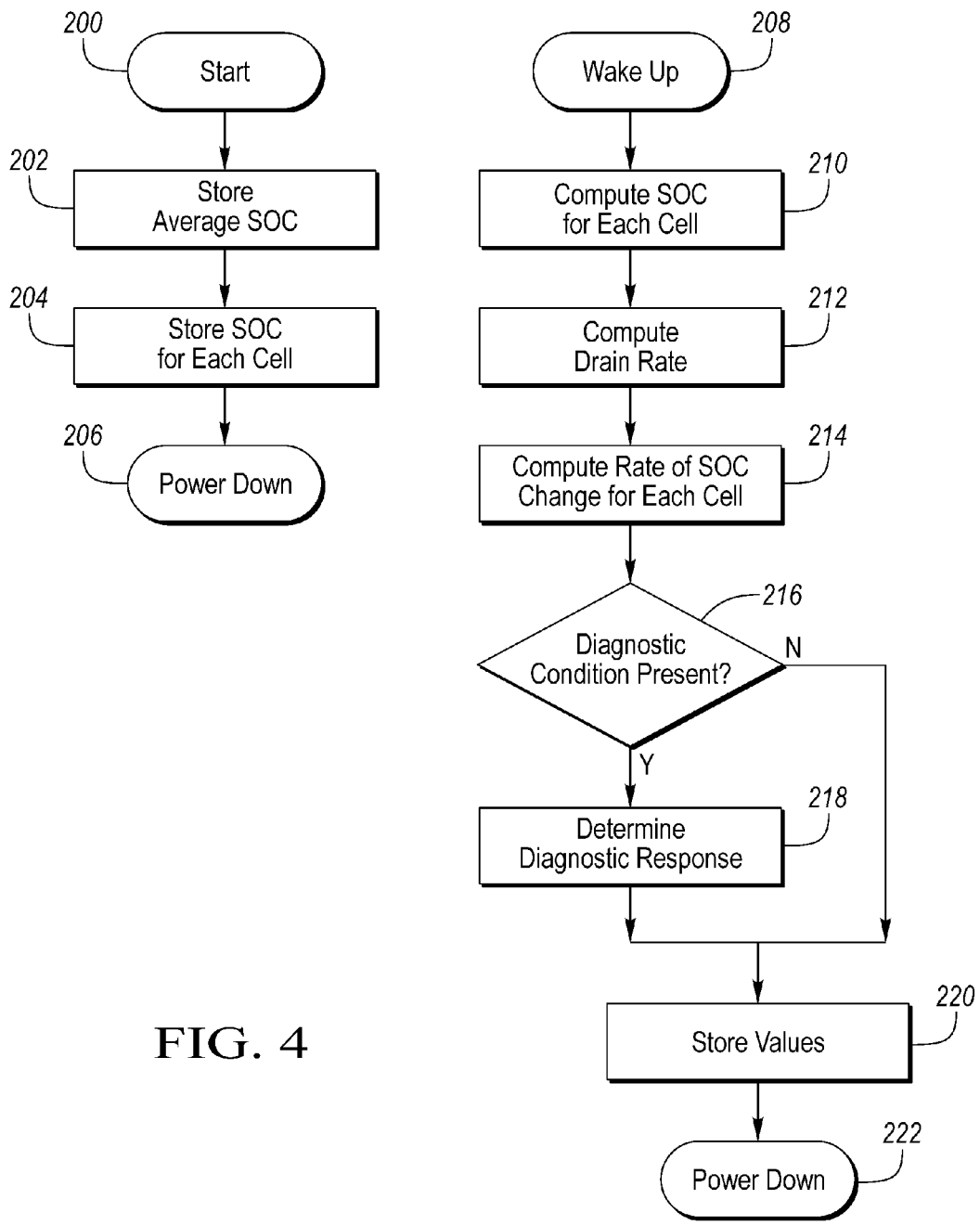
FIG. 4 is a flowchart illustrating a possible set of operations for identifying a drained cell diagnostic.

FIG. 4 depicts a flowchart for a possible implementation of the described system. The operations represented by the flowchart may be implemented in a controller 76. Operation will typically begin while the vehicle is in an operational mode, such as driving or charging. The present logic may start 200 when a power down is requested. At operation 202, the controller 76 may compute and store into non-volatile memory the average SOC value. At operation 204, the controller 76 may store the SOC value for each cell in non-volatile memory. The system may then power down 206. During power down, the controller 76 may be in a low-power mode. Before powering down, operations may be performed to initiate a wake up after a predetermined amount of time has elapsed (e.g., 30 minutes).

After the predetermined amount of time has elapsed, the controller 76 may wake up 208. At operation 210, instructions may be executed to compute the SOC for each of the battery cells. At operation 212, instructions may be executed to compute the drain rate for each cell. At operation 214, instructions may be executed to compute the rate of SOC change for each of the cells. At operation 216, instructions may be executed to determine the presence of a diagnostic condition as described previously. If a diagnostic condition is present, instructions may be executed at operation 218 to determine the diagnostic response. As described previously, the diagnostic response may depend on the magnitude of the drain rate. After the diagnostic response, operation 220 may be executed to store the computed values into non-volatile memory.

If no diagnostic condition is present, instructions may be executed at operation 220 to store the computed values in non-volatile memory. At operation 222, the controller may be powered down again until the next wake-up cycle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery management system comprising:
   at least one controller programmed to, in response to a magnitude of a difference between an average cell state of charge at a start of a battery rest period and at least one of a plurality of cell states of charge estimated at predetermined intervals during the battery rest period being greater than a predetermined value, output a drained cell diagnostic indicator.

2. The battery management system of claim 1 wherein the at least one controller is further programmed to output the drained cell diagnostic indicator in response to a magnitude of a difference between an average rate of change in cell state of charge over the predetermined intervals and a rate of change in cell state of charge between the predetermined intervals being less than a predetermined threshold for each of the predetermined intervals.

3. The battery management system of claim 1 wherein the at least one controller is further programmed to output the drained cell diagnostic indicator in response to a magnitude of a difference between a cell state of charge estimated at the predetermined intervals and a cell state of charge at the start of the battery rest period being greater than a predetermined difference.

4. The battery management system of claim 1 wherein the at least one controller is further programmed to operate a traction battery during a period of battery usage according to a cell drain rate that is based on the cell state of charge at the predetermined intervals and a cell state of charge at the start of the battery rest period.

5. The battery management system of claim 4 wherein the at least one controller is further programmed to operate the traction battery according to a battery power limit that is a predetermined minimum value when the cell drain rate is greater than a predetermined threshold.

6. The battery management system of claim 4 wherein the at least one controller is further programmed to operate the traction battery according to a battery power limit that is a predetermined percentage of a base battery power limit when the cell drain rate is greater than a predetermined threshold.

7. The battery management system of claim 4 wherein the at least one controller is further programmed to operate the traction battery according to a zero battery power limit when the drain rate is greater than a predetermined threshold and the cell state of charge at the predetermined intervals is outside of a predetermined range.

8. The battery management system of claim 1 wherein the average cell state of charge at the start of the battery rest period is an average of all of the cell states of charge at the start of the battery rest period.

9. The battery management system of claim 1 wherein the battery rest period is a period of time in which a magnitude of a battery current is less than a predetermined current.

10. A vehicle comprising:

a traction battery including a plurality of cells; and at least one controller programmed to reduce a maximum power requested from the traction battery by a predetermined percentage in response to a cell drain rate that is based on a cell state of charge at a start of a battery rest period and cell states of charge at predetermined intervals during the battery rest period being greater than a redetermined rate.

11. The vehicle of claim 10 wherein the at least one controller is further programmed to output a drained cell diagnostic indicator in response to a magnitude of a difference between an average cell state of charge at a start of the battery rest period and a cell state of charge estimated at predetermined intervals during the battery rest period being greater than a predetermined value.

12. The vehicle of claim 11 wherein the at least one controller is further programmed to output a drained cell diagnostic indicator in response to a magnitude of a difference between an average change in cell state of charge between the predetermined intervals and a change in cell state of charge between the predetermined intervals being less than a predetermined threshold for each of the predetermined intervals.

13. The vehicle of claim 10 wherein the cell drain rate is further based on a battery capacity and an elapsed time since the start of the battery rest period.

14. The vehicle of claim 10 wherein the at least one controller is further programmed to operate the traction battery according to a battery power limit that is a predetermined minimum value when the cell drain rate is greater than a predetermined threshold.

15. A method of operating a traction battery comprising:

outputting, by a controller, a drained cell diagnostic in response to a cell state of charge estimated at predetermined intervals during a battery rest period being outside of a predetermined range about an average cell state of charge computed at a start of the battery rest period; and operating, by the controller, the traction battery according to the drained cell diagnostic and a cell drain rate.

16. The method of claim 15 wherein the drain rate is based on a difference between the cell state of charge at the start of the battery rest period and the cell state of charge at the predetermined intervals.

17. The method of claim 15 wherein operating the traction battery includes limiting battery power to a predetermined minimum value when the cell drain rate is greater than a predetermined threshold.

18. The method of claim 15 wherein operating the traction battery includes limiting battery power to a predetermined percentage of a base battery power limit when the cell drain rate is greater than a predetermined threshold.

19. The method of claim 15 wherein outputting the drained cell diagnostic is further based on a rate of change of the cell state of charge between the predetermined intervals being within a predetermined range about an average rate of change of the cell state of charge over the predetermined intervals.

* * * * *